United States Patent [19]

Peyrot

[11] Patent Number: 4,669,890
[45] Date of Patent: Jun. 2, 1987

[54] MIXING DEVICE FOR VERTICAL FLOW FLUID-SOLID CONTACTING

[75] Inventor: Claude F. Peyrot, Des Plaines, Ill.

[73] Assignee: UOP Inc., Des Plaines, Ill.

[21] Appl. No.: 715,695

[22] Filed: Mar. 25, 1985

[51] Int. Cl.$^4$ .............................. B01J 8/02; B01J 8/04; C10G 11/10
[52] U.S. Cl. .................................... 366/341; 208/146; 261/97; 366/340; 422/191; 422/194; 422/195
[58] Field of Search ............... 366/336, 337, 340, 341; 422/191, 194, 195, 231; 261/97; 208/146, 143, 108

[56] References Cited

U.S. PATENT DOCUMENTS

| | | |
|---|---|---|
| 3,598,541 | 8/1971 | Hennemuth et al. |
| 3,598,542 | 8/1971 | Carson et al. ................... 422/194 X |
| 3,652,450 | 3/1972 | Boyd .................................. 208/146 |
| 3,697,416 | 10/1972 | Carson et al. ................... 422/191 X |
| 3,705,016 | 12/1972 | Ludwigsen et al. ............ 422/194 X |
| 3,723,072 | 3/1973 | Carson et al. ................... 422/194 X |
| 3,723,300 | 3/1973 | Carson et al. ..................... 208/146 |
| 3,824,080 | 7/1974 | Smith et al. |
| 4,087,252 | 5/1978 | Strahorn et al. |

*Primary Examiner*—Timothy F. Simone
*Attorney, Agent, or Firm*—Thomas K. McBride; John F. Spears, Jr.; John G. Tolomei

[57] ABSTRACT

A fluid mixing apparatus which is used in a vertical flow fluid-solid contacting column having a fluid inlet and a fluid outlet at opposite ends, two or more distinct beds of particulate material, and single or dual phase fluid flow. The mixing apparatus comprises a vertical flow barrier, positioned intermediate two adjacent beds of particulate material, having a substantially imperforate outer area and at least one central opening for passing fluid between beds and a fluid impingement compartment located at the center of the barrier. The impingement compartment has vertical sides containing at least two similarly sized inlet openings in communication with the upstream side of the barrier for receiving the fluid flow detained by the barrier into the compartment with the sides and inlet openings being arranged so that the projection of all inlets lie in a common horizontal plane and intersect the other inlet projections at equal angles so that fluid entering the compartment will converge at a centerpoint equidistant from all inlet openings. Mixing is promoted by sizing the inlet openings to produce fluid jets having a length at least equal to the distance between the inlet openings and the centerpoint so that the fluid streams impact turbulently. Fluid leaves the impingement compartment through a fluid outlet comprising the central opening of the barrier, which is in communication with the downstream side of the barrier and provides a balanced flow out of the impingement compartment.

12 Claims, 5 Drawing Figures

MIXING DEVICE FOR VERTICAL FLOW FLUID-SOLID CONTACTING

BACKGROUND OF THE INVENTION

This invention relates generally to the field of fluid-solid contacting. More specifically, this invention deals with the mixing of fluids between beds of particulate material. Included within the scope of this invention is the mixing of single phase or two phase fluids.

Fluid-solid contacting devices have a wide variety of applications. Such devices find common application in processes for hydrocarbon conversion and adsorption columns for separation of fluid components. When the fluid-solid contacting device is an adsorption column the particulate material will comprise an adsorbent through which the fluid passes. In the case of hydrocarbon conversion the fluid-solid contacting apparatus is typically a reactor containing catalyst. Typical hydrocarbon conversion reactions that may be carried out are hydrogenation, hydrotreating, hydrocracking, hydrodealkyalation.

Fluid-solid contacting devices to which this invention apply are arranged as an elongated cylinder having a vertical orientation through which an essentially vertical flow of fluid is maintained. Particulate material contained in this vessel is arranged in a series of vertically spaced beds. Fluids enters the vessel through at least one inlet and outlet located at opposing ends. The fluid can flow through the reactor in a upflow or downflow fashion. It is also commonly known to add or withdraw fluid from between the particulate beds. This is commonly done in adsorption schemes where the composition to the fluid passing between particle beds is changing or in hydrocarbon conversion processes where a quench system is used to cool fluid as it passes between beds.

Changes in the composition or properties of the fluid passing through the particular zone present little problem provided these changes occur uniformly. In adsorption systems these changes are the result of retention or displacement of fluids within the adsorbent. For reaction systems changes in temperature as well as composition of the fluid are caused by the particulate catalyst material contained in the beds.

Nonuniform flow of fluid through these beds can be caused by poor initial mixing of the fluid entering the bed or variations in flow resistance across the particulate bed. Variations in the flow resistance across the bed can vary contact time of the fluid within the particles thereby resulting in uneven reactions or adsorption of the fluid stream passing through the bed. In extreme instances this is referred to as channeling wherein fluid over a limited portion of the bed is allowed to move in a narrow open area with virtually no resistance to flow. When channeling occurs a portion of the fluid passing through the bed will have minimal contact with the particulate matter of the bed. If the process is one of adsorption the fluid passing through the channel area will not be adsorbed, thereby altering the composition of this fluid with respect to fluid passing through other portions of the absorbent bed. For a catalytic reaction the reduction in catalyst contact time will also alter the product composition of fluid as it leaves different portions of the catalyst bed.

In addition to problems of a fluid composition, irregularities in the particulate bed can also affect the density and temperature of the fluid passing through the bed. For many separations processe retained and displaced components of the fluid have different densities which tend to disrupt the flow profile through the bed. Nonuniform contacting with the adsorbent particles will exacerbate the problem by introducing more variation in the density of the fluid across the bed thereby further disrupting the flow profile of the fluid as it passes through the particle bed.

In reaction zones temperature variations are most often associated with nonuniform catalyst contact due to the endothermic or exothermic nature of such systems. Nonuniform contact with the catalyst will adversely affect the reaction taking place by overheating or overcooling the reactants. This problem is most severe in exothermic reactions where the higher temperature can cause further reaction of feed stock or other fluid components into undesirable products or can introduce local hot spots that will cause damage to the catalyst and/or mechanical components.

Therefore, in order to minimize the problems that are associated with variations in fluid flow through beds of particulate material, methods of remixing fluid between beds of catalyst or adsorbents have been incorporated into a number of processes. Devices for collecting and remixing a portion of the fluid moving through a series of particle beds are shown in U.S. Pat. Nos. 3,652,450 and 4,087,252. In these references, the remixing of the fluid is done in conjunction with the addition of a second fluid into the mixing zone between beds. In both of these references, mixing of the fluid passing between beds and the added fluid is performed in a number of discrete mixing chambers located in or between the lower boundary of the upper bed and the upper boundary of the lower bed.

U.S. Pat. No. 3,824,080 by Smith reveals an internal reactor configuration for mixing fluid passing between beds independent of a second added fluid in that zone. The Smith device collects a mixed phase fluid flow in a region between particle beds having a horizontal baffle containing a central opening for passing the fluid between beds. This central opening has a flow diverter device which directs all vapor flow through the top of the chamber and all liquid flow in through the sides. In the Smith invention, vapor and liquid impinge upon each other at right angles thereby effecting remixing. After the remixed vapor and liquid passes through the opening in the baffle it contacts another horizontal series of baffles for providing an even flow of fluid over the downstream particle bed.

U.S. Pat. No. 3,598,541 by Hennemuth et al. teaches the remixing of fluid passing between beds of particulate materials by direct impingement with a quench fluid added to the mixing zone. Mixing occurs in a centralized space through which all fluid passes. The centralized space contains an annular area defined by two vertically oriented cylinders. Fluid passing between beds enters via horizontally projecting holes in the outer cylinder, while the quench fluid enters through horizontally projecting holes in the inner cylinder. The lower end of the annular mixing zone communicates with the downstream particle zone to allow passage of the mixed fluid.

An object of the invention disclosed herein is to improve the mixing of fluids passing between beds of particulant material. It is a further object of this invention to achieve mixing of the fluid passing between beds independent of the addition of a second fluid into the zone between particle beds. A further object of this invention is to provide a simplified device for achieving mixing of fluid between beds which is easily incorporated into a minimal space between particle beds.

SUMMARY OF THE INVENTION

Therefore, in one embodiment this invention comprises a fluid mixing chamber for use in a vertical flow fluid-solid contacting vessel having fluid inlet and fluid outlet at opposite ends, and two or more vertically spaced discrete beds of particulate material.

In a more specific embodiment, the fluid mixing chamber comprises a vertical flow barrier positioned intermediate two particle beds having a substantially imperforate outer area and at least one central opening for passing fluid between zones; a fluid impingement compartment located at the center of said barrier having vertical sides containing at least two identical inlet openings restricted in size to produce a fluid jet, which are in communication with the upstream side of said barrier for receiving fluid detailed by the barrier with the vertical sides being arranged such that the projection of all inlets lie in a common horizontal plane and intersect the other inlet opening projections at equal angles thereby causing fluid entering the compartment to converge at a center point equidistant from inlet openings and within the projection of the fluid jets; at least one fluid outlet from the impingement compartment with an open area greater than that of the inlet openings which is in communication with the downstream side of the barrier and provides a balanced flow to the area downstream of the barrier; means on the upstream side of said barrier for conveying an equal amount of fluid from the periphery of the barrier to each inlet opening; and means for redistributing fluid from the outlet of the impingement compartment over the downstream particle bed.

More limited embodiments of this invention involve different means for adding, distributing, collecting or withdrawing fluid that enters or exits the impingement compartment and particular arrangements or configurations of the fluid collection barrier between particle beds and the impingement compartment.

Therefore, in its broadest sense, this invention is directed to a centrally located mixing section for receiving substantially the entire flow of fluid passing into a downstream bed which thoroughly mixes the fluid and passes it to the downstream particle bed in a balanced fashion to facilitate redistribution of the fluid. The mixing of the fluid is essentially derived by the configuration of the mixing zone. In this zone equal jets of fluid are directed into each other thereby producing turbulence which will promote vigorous mixing within the mixing zone and provide the fluid effluent with a uniform composition. Thus an important element of this invention is the provision of means for directing equal jets of fluid into each other in order to maximize turbulence in mixing. With this basic concept in mind, other objects embodiments and advantages of the invention will become readily apparent to those skilled in the art from the more detailed description that follows.

DETAILED DESCRIPTION OF THE INVENTION

As previously mentioned, this invention relates to a means of mixing fluid between particulate beds in a fluid-solid contacting device. The basic elements of this invention consist of a containment vessel, one or more beds of particulant material that are disposed in vertically spaced zones and a mixing chamber positioned between beds of particulate material. The invention itself resides in the particular arrangement of the mixing chamber and the components located therein. A more complete understanding of the interrelation between the various elements within the mixing chamber and the vertical flow column can be obtained from the figures provided.

Figure 1:
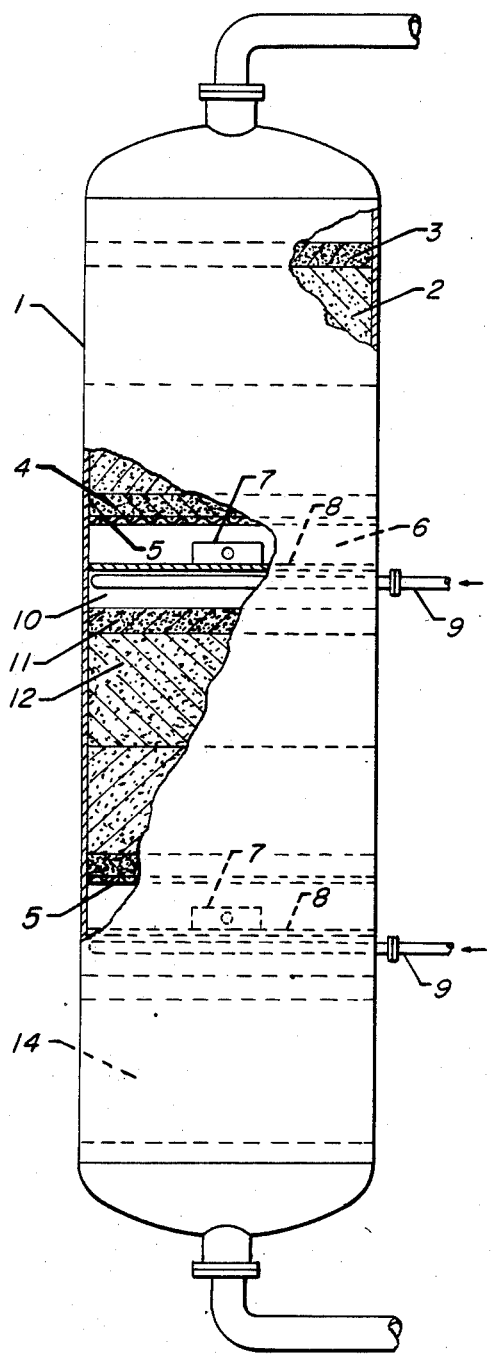
FIG. 1 shows a partially cutaway elevation view of a vertical flow contacting column having multiple beds of catalyst and mixing devices located between particle beds in accordance with this invention.

With specific reference to FIG. 1 the cutaway elevation view shows the column 1 with a fluid inlet nozzle located at its top and a fluid outlet located at its bottom. Located within this vessel are horizontal zones of catalyst 2, 12 and 14.

Each particle bed is composed of solid particles which can be in the form of pills, sphere cylinders or other extruded shapes. The actual properties of particles will depend upon the process which is carried out in the containment vessel. Generally, this means that the particles will consist of an adsorbent or a catalyst. Above each particle bed is a layer of support material 3, which serves to hold down the particles and enhance flow distribution over the bed. This material which is often employed, but not essential, will usually consist of ceramic balls or other inert compositions having a regular shape. Support material 4 is also often provided beneath the particle bed to prevent migration of the catalyst particles through a perforated plate profile or screen element that is used to define the lower boundary of the particle bed. Support material at the bottom of the catalyst bed is similar in shape and composition to that used above the bed.

Located between beds is the fluid collection and mixing region. Immediately below the particle retention plate 5 is located a fluid collection area 6. This collection area allows the transfer of fluid across barrier plate 8 to the impingement compartment 7. As shown in FIG. 1, the collection area can consist of an empty space that allows fluid flow in a horizontal direction. However, as discussed in more detail in conjunction with FIGS. 3, 4 and 5 the collection space may be integral with the barrier 8 so that the elements restricting fluid can also direct the fluid to the impingement compartment. Therefore, means for collecting fluid is not meant to be limited to any one configuration but contemplates any means for passing fluid to the impingement compartment. In its simplist form, the flow barrier 8 will consist of a plate attached and sealed at the column wall and having an open center over which impingement compartment 7 is located. However, the barrier can take on any form provided it substantially prevents fluid flow at any location except through the impingement compartment openings. The limitation of the barrier or baffle to substantially prevent fluid flow recognizes that particlate material from the various beds is often unloaded from the bottom of the vessel through the overlying beds. In order to accomplish this unloading, vertical conduits are commonly provided in the grids between the beds to allow the passage of the particulant material from one bed to the next for withdrawal from the contacting column. It is within the contemplation of this invention that the barrier will contain several such conduits. These conduits are usually left open but packed with the previously described inert support material. Therefore, resistance to fluid flow through these conduits is much greater than that of the herein described impingement compartment and collection system. Consequently the amount of fluid passing through these conduits should be less than 5% of the total flow of fluid between beds.

The impingement compartment, which is hereinafter described in more detail, receives fluid from the collection space 6 and, after through mixing, allows it to pass through the barrier 8. Below the barrier 8 is another space 10 that allows redistribution of the fluid. Once again in its simplest form this redistribution area is simply a space between the outlet of the impingement compartment and the top of the downstream catalyst bed. Nevertheless, it is possible to include other devices such as baffle plates, flow diverters or vapor-liquid trays to further aid in the redistribution of flow over the top of the downstream catalyst bed. Within the redistribution area 10 is shown a nozzle and a pipe system 9 for adding fluid or withdrawing fluid from the contacting column. In the case of separation processes this nozzle can be used to add or withdraw selected component streams. The specific application of this nozzle for downflow reactors is the addition of a quench medium to cool the reaction medium entering the next catalyst bed. While the nozzle and pipe system in FIG. 1 has been shown below barrier 8, it is also within the contemplation of this invention that the nozzle and pipe system be located above barrier 8 and possibly in the uppermost portion of the downstream catalyst bed or the lowermost portion of the upstream catalyst bed. The mixed fluid then enters the next bed of particulant material from which it may continue through subsequent remixing zones and particulate beds before leaving the column through a suitable outlet.

Figure 2:
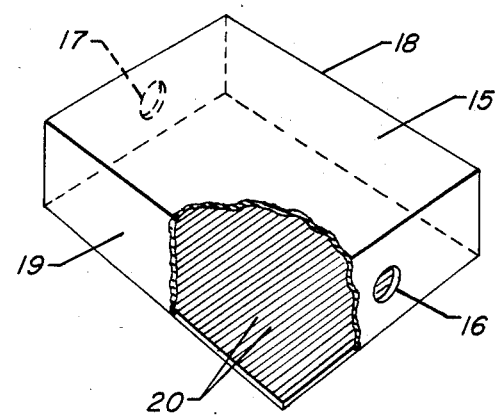
FIG. 2 is an isometric view of the mixing device from FIG. 1 removed from the rest of the column internals.

FIG. 2 depicts one embodiment of the impingement compartment. This particular imnpingement compartment is composed of two sides having inlet openings 16 and 17; a wire screen outlet 20 on the bottom; an imperforate top plate 15 and imperforate sides 18 and 19. The impingement compartment is not restricted to any particular shape. For example the impingement compartment could consist of a vertically oriented cylinder with side inlets and a bottom outlet. Nevertheless, there are some general dimensional limitations which are hereinafter discussed in more detail. The basic function of the impingement compartment is to provide intimate mixing of the fluid passing between beds of particulant material. Such mixing is achieved through the orientation and sizing of inlet opening 16 and 17. These openings are sized such that a jet or concentrated stream of fluid enters through each opening. The inlets are positioned such that the fluid jets impact upon each other in opposing fashion at a central point of the impingement compartment. In FIG. 2 only two inlet openings are shown, however it is possible to have more than two inlet openings provided the openings are located in a symmetrical fashion which balances the impingement of the jets in all directions. Also important to this invention is the vertical orientation of the inlet openings. All inlets should be located at the same elevation. This equal elevation is necessary to provide equal velocity impingement with no unbalanced components. Lastly, in terms of shape, there is no necessity that the inlet openings be round. The only essential requirement of the inlet opening shape is the restriction of its cross sectional area such that the necessary fluid jet is formed.

Obviously, the size and number of the openings will determine the length of the fluid jet for any given pressure drop through the impingement compartment. However, since it is usually desirable to minimize pressure drop in the vertical flow column practical considerations will restrict the length of the jet. As is well known by those skilled in the art, the pressure drop is a function of fluid velocity and average fluid density. Methods of calculating jet lengths and pressure drops over an opening or series of openings are well known by those skilled in the art. For most fluids to which this invention will be applied, the openings are sized for a velocity in the range of 15 to 50 feet per second. The mixing compartment must be sized to insure that the jets of fluid will impact with sufficient velocity to thoroughly mix the fluid. Therefore the distance between any inlet opening and the center point of the impingement compartment must not exceed 60% of the jet's calculated length. Thus the pressure drop and jet length considerations will dictate the length or diameter of the impingement compartment.

Although any shape of impingement compartment can be used, a square or rectangular impingement compartment having only two inlet openings is particularly preferred because of is simplicity and adaptability to the channel collection device hereinafter described. Where there are only two circular openings in the impingement compartment, the maximum distance between openings should not exceed six times the diameter of the inlet openings and preferably will be less than three inlet opening diameters. The reduced spacing between inlets tends to increase turbulence and promote better mixing. Of course some distance between inlet openings must be maintained. The minimum distance is required to allow sufficient outlet opening area and still maintain the required length to width ratio for the impingement compartment.

Furthermore, in order to maximize turbulence or mixing, the overall height of the mixing compartments should not exceed four times the vertical dimension of the inlet opening. Likewise, in order to prevent stagnant areas in rectangular configurations, the width of the impingement compartment should also be restricted to four times the horizontal dimension of the inlet openings. In the case of a circular cross section impingement compartment composed of a vertically oriented cylinder, either the restrictions on inlet openings, spacing or maximum width limitations may govern the diameter of the compartment.

Referring again to FIG. 2, the impingement compartment contains at least one outlet opening 20. The most important restriction on the outlet opening is that its open cross sectional area exceed that of the inlet opening. This is of course necessary to allow jets of fluid to form at the inlets to the compartment. In terms of velocity, it is usually desirable to design the outlet so that the velocity does not exceed 15 feet per second and is preferably less than 10 feet per second. Although it is not necessary to provide any form of restriction over the outlet, the opening may include profile wire as shown in FIG. 2, or perforated plate or wire screen. These outlet restrictions are often used to improve flow distribution, trap particulate material or minimize the foaming that can occur as a result of the turbulent mixing of certain fluids. In addition the location of the outlet opening is not restricted to any particular side or a single outlet opening. The outlet opening or openings may be located in any side of the impingement compartment which is in communication with the downstream portion of the mixing chamber as long as the opening or openings are symmetrical with the center line of the impingement compartment. The only limitation on the outlet opening or openings is that the location be symmetrical with respect to the downstream bed so that a balanced flow of fluid out of the impingement chamber is delivered to the downstream particulate bed. In this way, redistribution of the fluid over the bed of particulant matter is facilitated.

Although FIG. 1 generally depicts an arrangement for a downflow reactor, this invention is not limited to a single flow direction through the column. In the case of an upflow reactor, the inlets must be in communication with the lower particle bed and the impingement chamber reversed so that the outlet of the impingement compartment opens into an upper redistribution zone. Thus the mixing chamber of this invention is equally applicable to upflow or downflow configurations.

As noted in the prior art, many of the intermediate mixing devices use addition of an external fluid as an integral part of the mixing operation. Conversely, this apparatus does not require any external fluid addition to effect mixing of the fluid passing between beds of particulant material. Thus this invention has the advantage of providing good mixing of fluid passing between beds independent of the addition or withdrawal of fluid. Another advantage of this invention is the overall simplicity and compactness of the impingement compartment. These features make it possible to incorporate the mixing chamber of this invention into the existing space between a series of particulate beds without extensive modification of the contacting zone internals.

Apart from the impingement compartment, other components of the mixing chamber consist of the previously mentioned distributors, support materials, baffles and pipe grids. The design of these components depends on a number of factors. Among these factors are the allowable pressure drops for the equipment, the composition of the fluid passing between particle beds and the operating conditions within the contacting zone. In addition, for mixed phase systems, the quantity of vapor or liquid passing between beds will largely dictate the type of baffles required, the size of inlet and outlet openings through the barrier and the appropriate redistribution means. Other considerations that will affect the overall sizing and configuration of the mixing chamber is the addition of a quench. The placement and operation of the quench distribution system will require additional space within the mixing zone. Of course, the factors mentioned here by no means exhaust the list of mechanical and process considerations that will go into designing the mixing chamber. However, such considerations are well known by those skilled in the art and do not require further elaboration.

The mixing device of my invention is especially suited for use in a downflow reactor in combination with a barrier or baffle plate composed of a series of channels. Such a reactor is advantageously employed to carry out hydrogenation, hydrotreating, hydrocracking and hydrodealkylation reactions. When performing exothermic reactions, such as hydrotreating and hydrocracking, a quench stream is usually added between catalyst beds to control the temperature of the reactants. Operation of the mixing zone independent of the quench stream as offered by this invention is of particular advantage for these exothermic reactions. As catalyst deactivates with continued operation of the reaction zone, the amount or temperature of the quench, which usually consists of hydrogen, must be reduced. The reduction of cooling requirements for the quench poses problems in remixing zones that employ the quench as part of the mixing operation. In such schemes, it is often necessary to vary the temperature of the uench in order to achieve reduced cooling while still maintaining an adequate liquid volume addition of quench medium to the mixing zone. Since the quench in my invention is added independent of the impingement compartment, varying the amount of quench will have littel effect on the mixing of reactants.

Nevertheless it is also important to obtain good mixing of the quench stream and the reactants. Thus while it may be possible to obtain adequate mixing of the quench by a pipe distribution system located downstream of the impingement compartment, locating the quench distribution system upstream of the impingement compartment is particularly advantageous. With the quench stream located ahead of the impingement compartment there are two opportunities for the quenching medium to mix with the reactants. First mixing of the quench medium occurs at the initial distribution point of the quench into the reactants and again when the quench and reactants flow through the impingement compartment.

Figure 5:
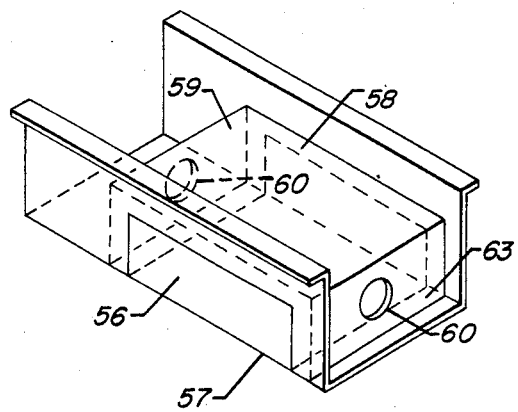
FIG. 5 is an isometric view depicting the mixing zone of FIGS. 3 and 4 within a portion of the channel.
Figure 3:
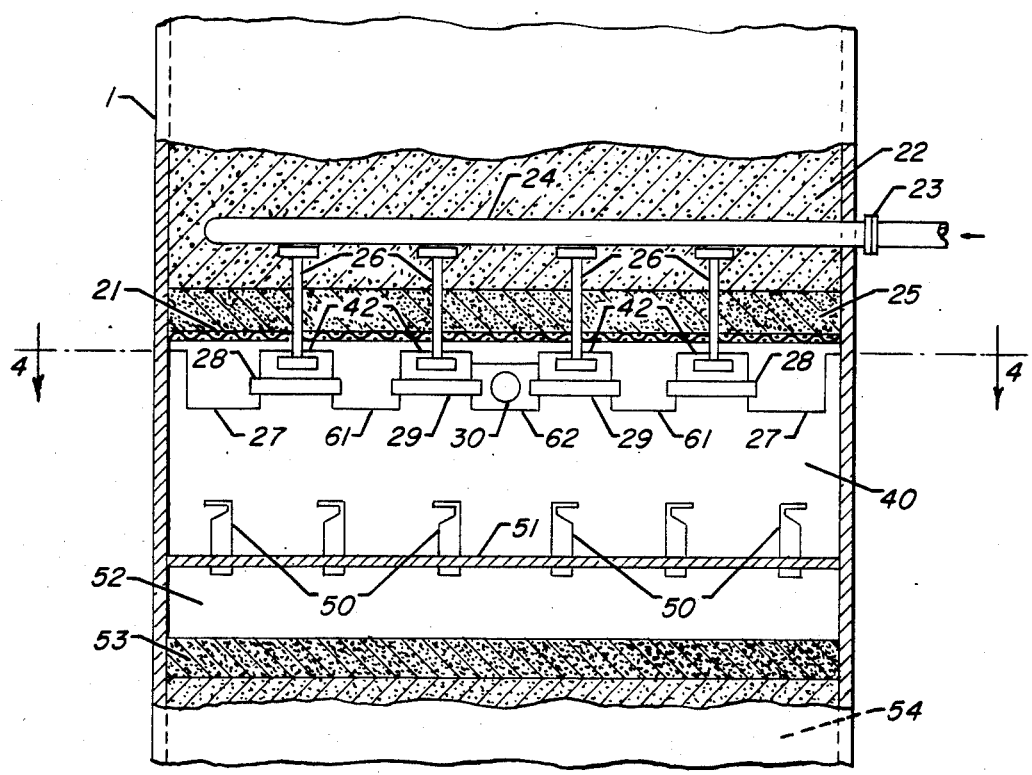
FIG. 3 is a partial elevation view of a downflow reactor with a cutaway proportion showing a more limited embodiment of the mixing chamber having a series of parallel channels for collecting fluid which passes through a rectangular mixing zone.
Figure 4:
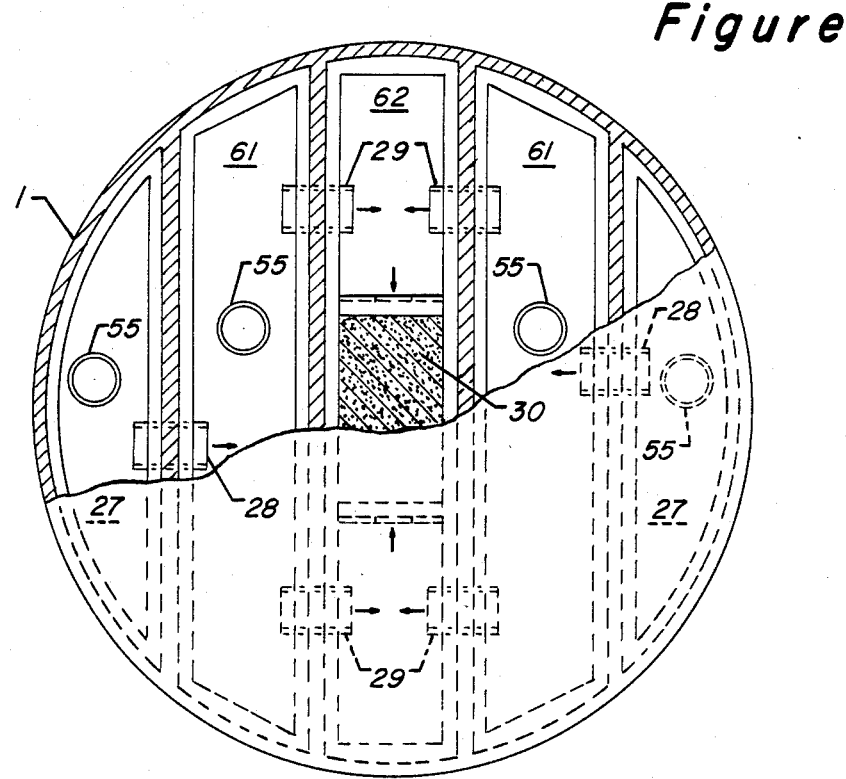
FIG. 4 is a plan view of the channel collection system for the mixing zone of FIG. 3.

Attention is now drawn to FIGS. 3, 4 and 5 wherein a specific combination of a quench system, vertical flow barrier and impingement compartment are incorporated beneficially into a downflow reactor. In this embodiment, an overall flow scheme in accordance with FIG. 1 is employed. Thus reactants enter a vertically elongated reactor and flow through a series of catalyst beds and intermediate mixing chambers. Looking now at FIG. 3, additional details of the intermediate mixing portion are shown.

In this arrangement reactants flow downwardly through catalyst bed 22 while a quench medium is added at nozzle 23 and distributed over a lower cross section of the catalyst bed by pipe distribution system 24. The reactants continue through support material 25 which rests on a wire mesh screen 21. Upon passing through the screen reactants and quench medium are collected in a series of parallel channels 27, 61 and 62, which run in a horizontal direction and are open to the upper catalyst bed. Fluid is conveyed from the outer channels 27 through the intermediate channels 61 to the center channel 62 by means of conduits 28 and 29 which allow fluid flow between channels. The center channel is divided into two parts by the impingement compartment 30 as shown in FIG. 4. In order to provide equal amounts of fluid to each side of the impingement compartment, four conduits 29 are used to provide an equal flow of fluid on each side of the compartment. Fluid leaving the outlet to the compartment enters redistribution zone 40 where vapor and liquid are redistributed over the entire area of the lower catalyst bed. In order to promote better distributions of the mixed vapor and liquid stream, a vapor liquid redistributor 51 is located at the top of the lower catalyst bed. These types of trays are well known to those skilled in the art and consist of horizontal tray portion 51 and vertical conduits 50 located therein having a covered top, V-notch opening in an upper portion for receiving vapor and perforated side portions adjacent the upper tray surface for allowing the passage of liquid. Following passage through the vapor liquid redistributor tray the fluid enters another open region 52 where further redistribution may take place. Fluid then passes through a layer of support material 53 and continues on through the next catalyst bed 54.

A more complete understanding of the arrangement of the collection channels and impingement compartments can be obtained from FIG. 4 which shows a plan view of these internals. The ends of the channels have closures that match the outline of the containment vessel. Outer collection spaces 27 may be connected to the next inward channels by means of a single conduit 28. The conduits connecting channels are designed for minimum pressure drop. The maximum fluid velocity through conduits 28 and 29 shall not exceed 15 feet per second and is preferably less than 10 feet per second. Fluid collected in intermediate channel 61 along with fluid from outer channels 27 passes through central channel 62 which contains impingement compartment 30. Fluid is directed into the central channels in a symmetrical fashion to provide an equal volume of fluid to either side of the compartment. FIG. 4 also shows vertical conduits 55 which are used in unloading catalyst from the reactor as previously discussed.

FIG. 5 shows the impingement compartment which is located in central channel 62. As can be appreciated from the drawings, the impingement compartment is integral with the channel on three sides 56, 57 and 58. These sides contain a perforated section in the area of the impingemenet compartment which serves as an outlet for the mixed fluid. In this particular embodiment the opposing sides 59 and 64 contain inlet openings 60 in the form of circular orifices and are of a lesser height than the depth of the channel. This reduced height allows additional fluid passage over the top of the impingement compartment 59 which serves to equalize any imbalance in fluid flow to the inlets. However, it is also possible to have the end plates containing the inlet openings completely block the cross sectional area of the channel.

This embodiment is not meant to limit the way in which a channel may be integrated with the impingement chamber. The impingement chamber and channels of this invention may be combined in any number of arrangements. Other possibilities include having the inlet streams of the impingement compartment flow in a direction perpendicular to the major axis of the channels or using an even number of channels with the impingement compartment located between two center channels.

Those familiar with the design of reactor internals can readily appreciate the economy in the arrangement of internals depicted in FIG. 3. First the fluid collection channel which also forms the barrier of baffle for the vertical flow of flow are compact and require little vertical space within the reactor. In addition, these channels are easily fabricated with a support flange portion 42 to fit upon a series of parallel support beams 26 which are frequently used to hold up the catalyst bed. Moreover no additional space is required for the impingement compartment which can be conveniently located in the central channel. The location of the channel collection system is also advantageous in that it does not interfere with the location of the quench distribution system on the upper portion of the support beams. Thus whether incorporated in a downflow reactor or more generally in any vertical flow fluid solid contacting column the collection channel and impingement compartment offer unique benefits to an intermediate mixing zone.

I claim as my invention:

1. A fluid mixing apparatus for use in a vertical flow fluid-solid contacting column having at least one fluid inlet and a fluid outlet at opposite ends of said contacting column, two or more vertically spaced discrete beds of particulate material, and single or dual phase fluid flow, said fluid mixing apparatus comprising:
   a. a flow barrier, for substantially preventing the vertical flow of fluid positioned intermediate any two adjacent beds, said flow barrier having a substantially imperforate outer area and at least one central opening for passing fluid between beds;
   b. a fluid impingement compartment located at the center of said flow barrier having a hollow interior, an imperforate top, vertical sides containing at least two substantially identical inlet openings restricted in size to produce a fluid jet, said inlet openings communicating the upstream side of said flow barrier with the interior of said compartment, and each of said inlet openings having an axial centerline, said inlet openings being arranged such that the axial centerlines of all of said inlet openings lie in a common horizontal plane and intersect at a centerpoint equidistant from all of said inlet openings with the path of each of said centerlines being unobstructed between its corresponding inlet opening and said centerpoint, said fluid impingement compartment having at least one fluid outlet comprising said central opening of said flow barrier and having an open area greater than the combined area of all said inlet openings;
   c. means on the upstream side of said flow barrier for conveying an equal amount of fluid from the periphery of said flow barrier to each said inlet openings; and
   d. means for redistributing fluid from said fluid impingement compartment outlet of said fluid impingement compartment over the downstream bed of particulate material.

2. The apparatus of claim 1 wherein means for adding and distributing, or collecting and withdrawing fluid from said column intermediate said fluid inlet and fluid outlet is provided upstream or downstream of said flow barrier.

3. The apparatus of claim 1 wherein said fluid impingement compartment outlet consists of perforated plate, profile wire, or screen material.

4. The apparatus of claim 1 wherein said fluid impingement compartment is substantially rectangular in shape having circular inlet opening in two opposed vertical sides.

5. The apparatus of claim 1 wherein said conveying and redistribution means consists of free zones between said flow barrier and the lower and upper boundary of said beds of particulate material.

6. The apparatus of claim 1 wherein said inlet openings of said fluid impingement compartment are sized for a velocity in the range of 15 to 50 ft./sec. and the outlet openings of said fluid impingement compartment are sized for a maximum velocity of less than 15 ft./sec.

7. The apparatus of claim 4 wherein the distance between opposing inlet openings does not exceed six inlet opening diameters.

8. The apparatus of claim 7 wherein the maximum dimension of said fluid impingement compartment perpendicular to inlet opening centerline does not exceed three inlet opening diameters.

9. The apparatus of claim 1 wherein said flow barrier comprises a series of open parallel channels concave to the upstream bed of particulate material and connected by conduits such that fluid is collected in said channels and conveyed to said fluid impingement compartment.

10. The apparatus of claim 9 wherein said vertical flow fluid-solid contacting column is a downflow reactor.

11. The apparatus of claim 10 wherein:

a. the apparatus contains a space above said flow barrier and below an upper catalyst bed for collecting fluid;
b. an odd number of channels in said flow barrier;
c. a fluid impingement compartment located in a center channel with the sides of the center channel defining the horizontal bottom and two parallel vertical sides of said fluid impingement compartment and having outlets for said fluid impingement compartment located in said horizontal bottom side, an imperforate horizontal plate located in an upper center portion of said channel which forms the top of said fluid impingement compartment, and two opposing vertical end plates for said impingement compartment which extend to the sides of said channel, with each end plate containing a single circular inlet opening; and
d. a space below said flow barrier and above a lower catalyst bed for distributing fluid.

12. The apparatus of claim 11 wherein a quench distribution system is located above said flow barrier.

* * * * *